United States Patent [19]

Freeman et al.

[11] 4,187,872
[45] Feb. 12, 1980

[54] CONTROL VALVE ASSEMBLY

[75] Inventors: Murray E. Freeman; Harmon E. Shipper, both of Pasadena, Tex.

[73] Assignee: Tapco International, Inc., Houston, Tex.

[21] Appl. No.: 929,817

[22] Filed: Jul. 31, 1978

Related U.S. Application Data

[63] Continuation of Ser. No. 737,509, Nov. 2, 1976, abandoned.

[51] Int. Cl.² ............................................. F16K 11/12
[52] U.S. Cl. ............................... 137/454.6; 137/599; 137/599.2; 137/614.17; 137/637.5; 251/188
[58] Field of Search ................. 137/454.6, 599, 599.2, 137/614.17, 637.5; 251/91, 188

[56] References Cited

U.S. PATENT DOCUMENTS

| | | | |
|---|---|---|---|
| 1,744,143 | 1/1930 | Roberts | 251/91 X |
| 2,323,480 | 7/1943 | MacDougall | 137/599 X |
| 2,590,569 | 3/1952 | Peterson | 137/599.2 |
| 2,652,225 | 9/1953 | Peterson et al. | 251/91 |
| 2,664,263 | 12/1953 | Stadler | 251/188 |
| 2,769,456 | 11/1956 | Atkinson | 137/637.5 X |
| 2,880,748 | 4/1959 | Elsey | 137/454.6 X |
| 3,456,679 | 7/1969 | Graham | 137/454.6 |

FOREIGN PATENT DOCUMENTS

| | | | |
|---|---|---|---|
| 339804 | 8/1921 | Fed. Rep. of Germany | 137/599 |
| 756737 | 9/1933 | France | 137/599.2 |

Primary Examiner—Robert G. Nilson
Attorney, Agent, or Firm—Pravel, Gambrell, Hewitt, Kirk, Kimball & Dodge

[57] ABSTRACT

A control valve assembly for controlling fluid flow in a flowline having a housing with a normally operative flow control structure and bypass structure therein for providing independent first and second flow paths for allowing controlled fluid passage through the housing from the flowline through the first and second flow paths, as desired.

29 Claims, 7 Drawing Figures

CONTROL VALVE ASSEMBLY

This is a continuation, of application Ser. No. 737,509, filed Nov. 2, 1976 now abandoned.

BACKGROUND OF THE INVENTION

The field of this invention is control valves for controlling fluid in a flowline, particularly of the type having internal bypass features.

Control valves for controlling fluid flow in a flowline have long been and are well known in the art such as disclosed in U.S. Pat. Nos. 189,916; 661,175; 1,860,510; 3,330,296; 3,347,260; 3,698,418; 3,780,758; French Pat. No. 1.912.779 and Norwegian Pat. No. 184,703, all disclosing valve elements that are rotatable to regulate fluid flow. Some valves in the prior art may be disassembled for inspection and repair without being removed from the flowline such as disclosed in U.S. Pat. No. 3,840,042. Additionally, the prior art discloses the use of multiple rotatable elements within fluid control valves to permit replacement of the valving element without removing the valve housing from the flowline, such as disclosed in U.S. Pat. Nos. 1,841,050; 2,769,456; 2,997,057; 3,700,003; and, 3,881,517. However, none disclose continued fluid operation through the valve to continue operation of the fluid flowline while such a valving element is being replaced.

SUMMARY OF THE INVENTION

The present invention relates to a new and improved control valve assembly for controlling fluid flow in a flowline having a housing with a normally operative flow control means and bypass means mounted substantially within the housing for providing a first flow path to allow passage of fluid from the flowline through the housing wherein the flow control means normally controls fluid flow through the first flow path while the bypass means independently of the flow control means may control fluid flow through the first flow path, and the bypass means further providing a second flow path to allow passage of the fluid from the flowline through the housing as desired.

DESCRIPTION OF THE PREFERRED EMBODIMENT

Referring to the drawings, the letter A designates generally the control valve assembly of one embodiment of this invention which is illustrated in FIGS. 1-5 and 7. The control valve assembly A includes a housing H, a normally operative flow control means F, and bypass means B. Unless otherwise noted, the components of this invention are preferably made of steel or other high-strength materials capable of taking high stresses and strains typical of fluid-pressure systems.

Figure 1:
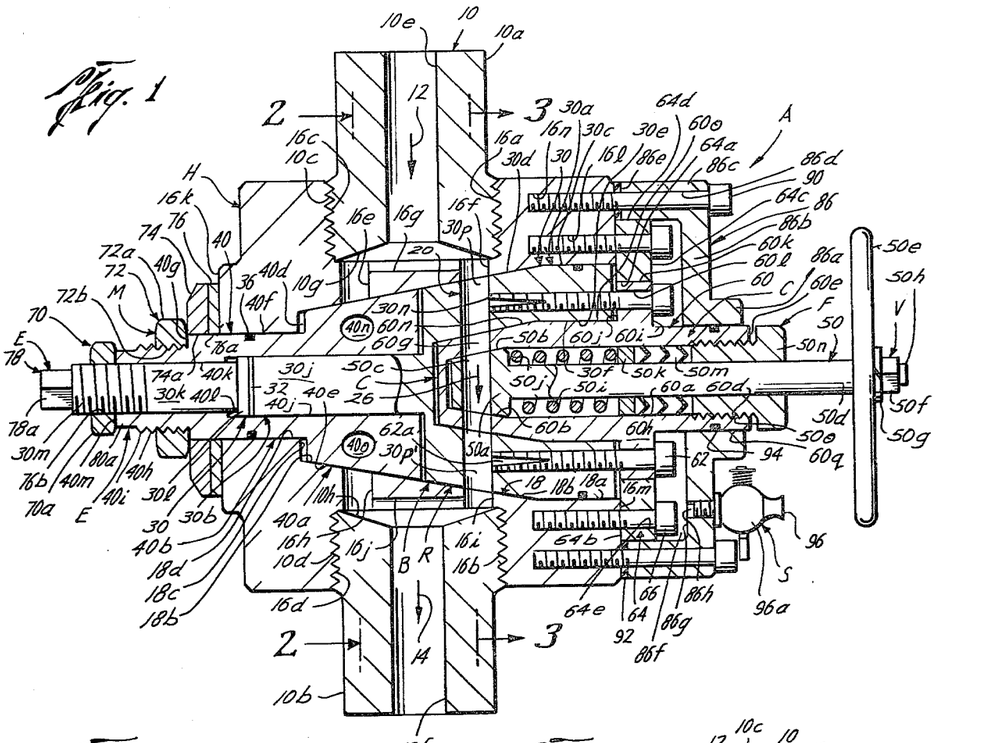
FIG. 1 is an elevational view, partly in section, of the first embodiment of the control valve assembly of the present invention, with fluid flow through the first flow path.

As shown in FIG. 1, the control valve assembly A of the present invention is adapted to be used for controlling fluid flow within a flowline 10. The flowline 10 includes flowline portions 10a, 10b having bores 10e, 10f, respectively, wherein fluid may flow. Fluid flow in the flowline 10 may be in the direction of arrow 12 in flowline portion 10a, through the control valve assembly A of the present invention, and outwardly therefrom in flowline portion 10b in the direction of arrow 14. It should be noted that the control valve assembly A of the present invention is capable of being used with fluid flowing in the flowline 10 in the direction of arrows 12, 14 or alternatively with reverse flow in the opposite direction of arrows 12, 14. Thus, the control valve assembly A is not limited to fluid flow in either direction through flowline 10.

The control valve assembly A includes a housing H. The housing H includes a housing 16 adapted to be mounted with the flowline 10. The housing 16 is formed with openings 16a, 16b adapted to receive flowline portions 10a, 10b, respectively. Preferably, openings 16a, 16b have threads 16c, 16d adapted to threadedly engage compatible threads 10c, 10d formed with flowline portions 10a, 10b, respectively, for suitably mounting the flowline 10 with the housing 16 for fluid flow in the direction of arrows 12, 14.

The housing 16 is preferably formed having passageways 16e, 16f formed therein preferably with the longitudinal axes in substantial parallel alignment with the longitudinal axis of the opening 16a and adjacent thereto, with a connecting passageway 16g preferably transverse thereto joining passageways 16e, 16f adjacent the opening 16a and flowline portion 10a. Similarly, passageways 16h, 16i are formed within the housing adjacent opening 16b being in substantially parallel alignment with the opening 16b and bore 10f of flowline portion 10b having connecting passageway 16j substantially transverse thereto for joining passageways 16h, 16i with the opening 16b and flowline portion 10b. Bore 10e and passageways 16e, 16f, 16g are all in fluid communication with one another as is bore 10f with passageways 16h, 16i, 16j. Preferably, tapered end surfaces 10g, 10h of flowline portions 10a, 10b enhance fluid distribution to passageways 16e, 16f, 16g and 16h, 16i, 16j, respectively.

The control valve assembly A of the present invention includes a normally operative flow control means F and a bypass means B mounted substantially within the housing H for providing a first flow path 20 to allow the passage of fluid from the flowline 10 through the housing H. The normally operative flow control means F normally controls flow through the first flow path 20 and the bypass means B controls fluid flow through the first flow path 20 independent of the normally operative flow control means F. The bypass means B further provides a second flow path 24 to allow the passage of fluid from the flowline 10 through the housing H as desired.

Figure 4:
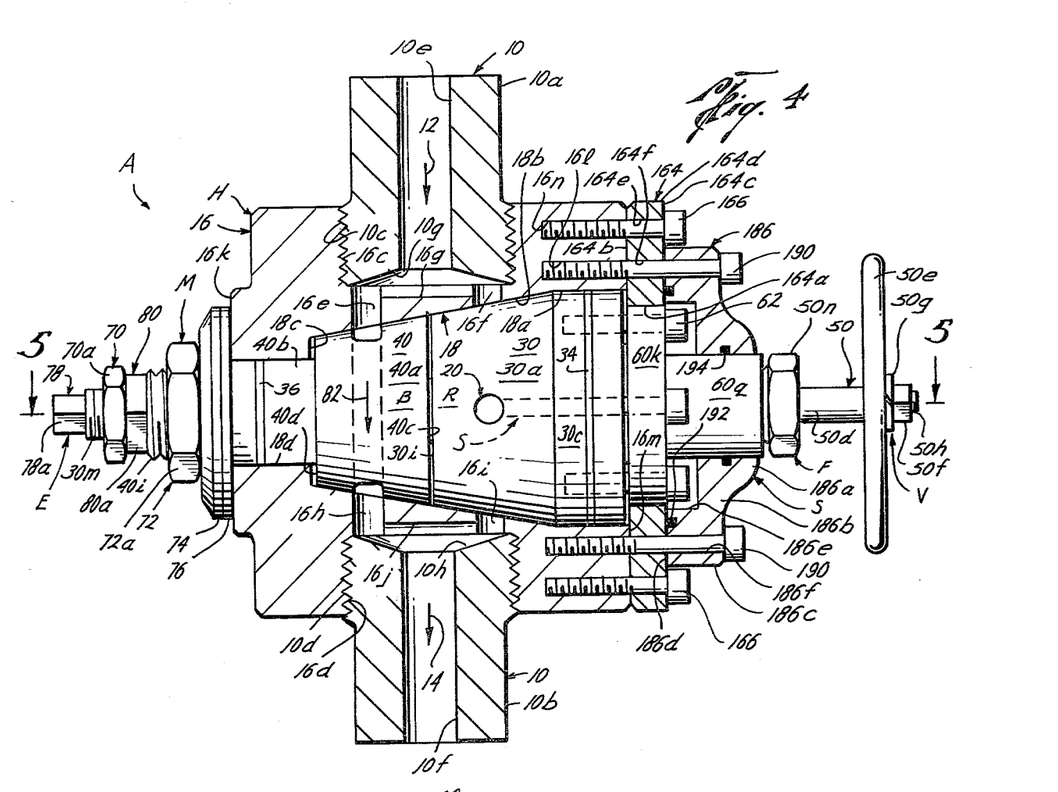
FIG. 4 is an elevational view, partly in section, of the first embodiment of the control valve assembly of the present invention, with fluid flow through the second flow path.

The bypass means B of the control valve assembly A of the present invention includes a rotatable element R disposed substantially in the housing H such that the bypass means B is movable between a first position wherein fluid is capable of flowing through the first flow path 20, as shown in FIG. 1 in the direction of arrow 26, and a second position wherein fluid does not flow through the first flow path 20, as shown in FIG. 4. The bypass means B is preferably mounted in the housing H for movement between such first and second positions and preferably includes rotatable movement between the first and second positions by the rotatable element R.

The rotatable element R, as shown in FIGS. 1–5, includes a front rotatable element 30 and a rear rotatable element 40. The front rotatable element 30 includes a body portion 30a and a shaft portion 30b extending from the body portion 30a. The body portion 30a is preferably formed having an exterior surface 30c preferably of a cylindrical configuration and an exterior tapered surface 30d is preferably of a conical, tapered configuration. The body portion 30a preferably is of a hollow configuration having a capsule receiving chamber 30e therein as defined by inner surfaces 30f, 30g, 30h, with surface 30f being of a substantially cylindrical configuration, surface 30g being of a substantially conical, tapered configuration and being truncated adjacent end surface 30h. Similarly, the tapered surface 30d terminates at end surface 30i.

The shaft portion 30b is formed with the body portion 30a of front rotatable element 30 adjacent end surface 30i with the shaft portion 30b and body portion 30a having their respective longitudinal axes in substantial longitudinal alignment. The shaft portion 30b includes preferably two shaft portion elements 30j, 30k having longitudinally aligned axes with shaft portion element 30j being formed with the end surface 30i of the front rotatable element 30 and shaft portion element 30k being formed with shaft portion element 30j adjacent shoulder 30l, with the shaft portion element 30k extending therefrom shaft portion element 30j. Shaft portion element 30k has threads 30m formed therewith and further includes engaging means E formed therewith as described more fully hereinbelow. Passageways 30p, 30p' are formed extending between tapered surfaces 30d, 30g and are adapted to be aligned with passageways 16f, 16i, respectively, as described below.

The rear rotatable element 40 is adapted to be disposed about the shaft portion 30b of the front rotatable element 30. The rear rotatable element 40 includes a body portion 40a and a shaft portion 40b. The body portion 40a is preferably defined by end surfaces 40c, 40d having a conical, tapered surface 40e therebetween. End surface 40c is adapted to be positioned adjacent end surface 30i with tapered surface 40e in substantial alignment with tapered surface 30d of the front rotatable element 30. The shaft portion 40b extends from end surface 40d and includes exterior cylindrical surface 40f, shoulder 40g, cylindrical surface 40h having threads 40i formed therewith and further including engaging means E as described more fully hereinbelow. The rear rotatable element 40 further includes bore 40j formed therein extending through the body portion 40a from end surface 40c and into a section of the shaft portion 40b. Counterbore 40k is formed adjacent bore 40j at radial lip 40l. Counterbore 40k and shaft portion 40b terminate at end surface 40m.

The rotatable element R is adapted to be disposed substantially within the housing H. The housing 16 includes a rotatable element chamber 18 formed therein of slightly larger dimension than the rotatable element R. The rotatable element chamber includes an inner annular surface 18a adjacent outer surface 16m of housing 16 corresponding substantially to exterior surface 30c, an inner conical, tapered surface 18b adjacent surface 18a corresponding substantially to that of exterior tapered surfaces 30d, 40e, a radial lip 18c adjacent surface 18b and end surface 40d and an opening 18d extending from the radial lip 18c to the outer surface 16k of the housing 16.

The rear rotatable element 40 is disposed about the shaft portion 30b of the front rotatable element 30 such that shaft portion element 30j is disposed within bore 40j of the rear rotatable element 40 having a suitable seal 32 therebetween, such as an O-ring or the like and shaft portion element 30k is mounted within counterbore 40k. Shaft portion elements 30j, 30k are of slightly smaller diameter than that of bore 40j and counterbore 40k, respectively, with the shaft portion element 30k adapted to extend through counterbore 40k and outwardly therefrom. It should be noted that radial lip 40l and shoulder 30l do not engage one another and form a cavity (not numbered) therebetween as described more fully hereinbelow.

The rotatable element R including front rotatable element 30 and rear rotatable element 40 is adapted to be disposed within the rotatable element chamber 18 of the housing 16. As such, the exterior surfaces of the rotatable elements 30, 40 are of slightly less diameter than the corresponding surfaces of the rotatable element chamber 18. More specifically, exterior surface 30c us adapted to be disposed within and adjacent to surface 18a, tapered surfaces 30d, 40e are adapted to be disposed within tapered surface 18b, and exterior surface 40f is adapted to be disposed within opening 18d. It should be noted that end surface 40d and radial lip 18c do not engage one another and form a cavity (not numbered) therebetween. Such cavity, as the cavity between surfaces 40c, 30i allows the rotatable element R to be drawn into the tapered surface 18b of the rotatable element chamber 18 in a tight, engaging relation.

Figure 5:
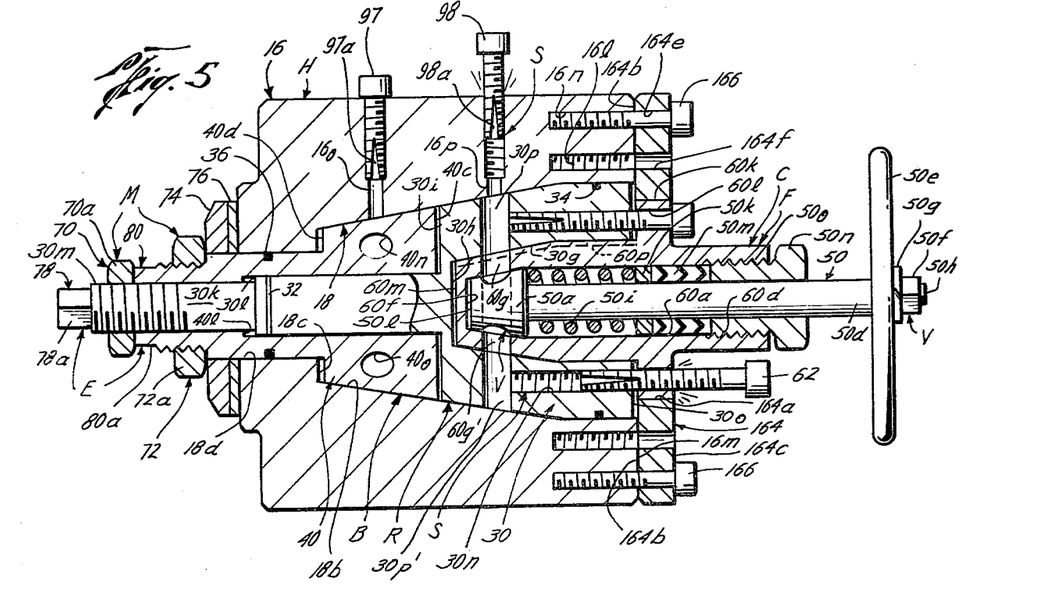
FIG. 5 is a plan view, partly in section, taken along the lines 5—5 of FIG. 4 of the control valve assembly of the present invention.

Suitable sealing means 34, 36, may be mounted with the rotatable element R for preventing fluid migration therebetween the rotatable element R and the housing H. The sealing means 34, 36 may include O-rings or any other suitable sealing material and may be mounted with either the rotatable element R or with the housing H. As shown in FIGS. 1, 4, 5, however, sealing means 34, 36 are preferably mounted with the front rotatable element 30, and rear rotatable element 40, respectively, such that sealing means 34 with exterior surface 30c engages surface 18a of the rotatable element chamber 18 and sealing means 36 with exterior surface 40f of the rear rotatable element 40 engages opening 18d formed in the housing 16.

The control valve assembly A of the present invention includes a normally operative flow control means F. The flow control means F normally controls the flow through the first flow path 20. The flow control means F includes valve means V for regulating flow within the first flow path 20 and a valve capsule C disposed substantially within the rotatable element R for receiving the valve means V therein.

The valve means V may include many conventional valving elements. As shown in FIG. 1, the valve means V includes a plug valve 50. The plug valve 50 includes a valve portion 50a having preferably a conical, tapered exterior surface 50b and having a passageway 50c therethrough. The valve portion 50a is formed with valve stem 50d. A valve actuator 50e is suitably affixed to the valve stem 50d by an appropriate fastener such as a nut 50f-washer 50g assembly, with the nut 50f being threadedly affixed to the valve stem 50d at threads 50h formed with the valve stem 50d. A resilient spring 50i is mounted about the valve stem 50d therebetween shoulder 50j of the valve portion 50a and spring plate 50k on valve stem 50d for preventing unwanted rotation of the valve means V during operation.

The valve means V is adapted to be disposed within the valve capsule C. The valve capsule C includes valve capsule element 60 having an inner bore 60a having conical, tapered surface 60b formed adjacent thereto and terminating at end surface 60f. Threads 60d are formed adjacent end surface 60e in bore 60a. The plug valve 50 is mounted within the valve capsule element 60 such that the valve portion 50a is disposed within the tapered surface 60b of the valve capsule element 60 with end surface 50l of the plug valve 50 being disposed adjacent end surface 60f of the valve capsule element 60. As such, the passageway 50c in the plug valve 50 aligns with passageway 60g, 60g' of the valve capsule element 60. The spring 50i is positioned within the bore 60a as is the spring plate 50k. A suitable packing material 50m is disposed between the spring plate 50k and gland nut 50n. The gland nut 50n threadedly engages threads 60d of the valve capsule element 60 by threads 50o for securing the valve means V within the valve capsule C.

The valve capsule element 60 further includes a flange portion 60h having radial surfaces 60i, 60j and annular end surface 60k therebetween. Suitable openings 60l are formed in the flange portion 60h for receiving suitable fasteners such as bolts 62 and the like. Threaded openings 30n formed in the front rotatable element 30 are adapted to receive bolts 62 which extend through openings 60l to secure the valve capsule element 60 with the front rotatable element 30. Preferably, the threaded openings 30n extend between end surface 30o and passageways 30p, 30p'. Passageways 30p, 30p' preferably are in axial alignment with passageways 60g, 60g' formed in the valve capsule element 60.

Thus, the valve capsule element 60 is mounted substantially within the front rotatable element 30 with the end surface 60m of the valve capsule element 60 being disposed adjacent the end surface 30h of the front rotatable element 30, exterior tapered surface 60n disposed in contact with interior tapered surface 30g and exterior annular surface 60o adjacent interior annular surface 30e. It should be noted that when the valve capsule element 60 is secured with the front rotatable element 30, that end surfaces 30h, 60m do not engage one another leaving a cavity (not numbered) therebetween and that end surface 30o and radial surface 60j of the flange portion 60h of the valve capsule element 60 do not contact one another due to contact between tapered surfaces 30g, 60n preventing such.

A retaining ring 64 is mounted with the housing 16. The retaining ring 64 has an inner annular surface 64a that abuts annular surface 60k of the valve capsule element 60, end surfaces 64b, 64c and exterior annular surface 64d. Suitable openings 64e are formed therein to receive suitable fasteners such as bolts 66 which are threadedly received in the housing 16 in suitable threaded openings 16l formed therein. With the retaining ring 64 secured to the housing 16, end surface 64b abuts outer end surface 16m of the housing 16.

Figure 3:
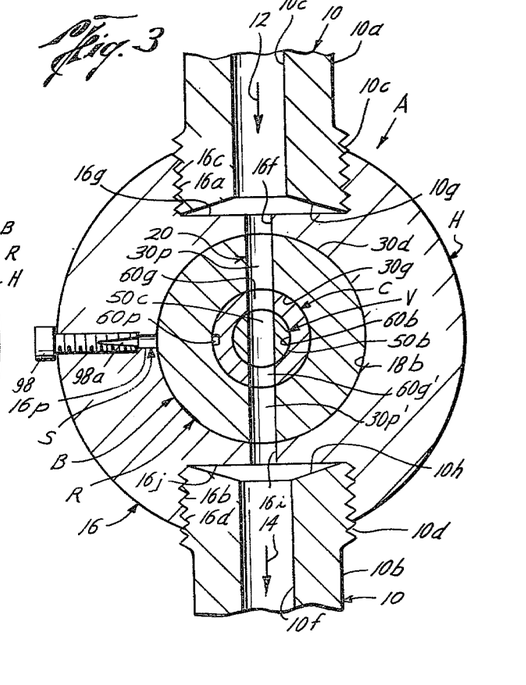
FIG. 3 is an end view, partly in section, taken along the lines 3—3 of FIG. 1 of the control valve assembly of the present invention.

Thus, the first flow path 20 includes passageways 30p, 30p', 50c, 60g and 60g' as shown in FIG. 3. Further, it is desirable that a longitudinal slot 60p (FIGS. 3, 5) be formed with the exterior surface of the valve capsule element 60 with the slot 60p communicating with the cavity therebetween end surfaces 30h, 60m and the cavity therebetween surfaces 60j and 30o.

The rear rotatable element 40 is disposed about the front rotatable element 30 in rotatable element chamber 18 in the housing 16. The rear rotatable element 40 is formed having passageways 40n, 40o formed therein about bore 40j. Although the body portion 40a of the rear rotatable element 40 is of a substantially truncated, conical configuration, slots 40p, 40q (FIG. 2) are formed adjacent the end portions of passageways 40n, 40o. Thus, passageways 40n, 40o may communicate with passageways 16e, 16h of the housing 16 adjacent slots 40p, 40q when such slots 40p, 40q are positioned adjacent to the passageways 16e, 16h. Thus, the second flow path 24 is formed by passageways 40n, 40o and slots 40p, 40q.

The rotatable element R is adapted to be mounted for rotatable movement within the housing H. Anti-movement means M releasably secures the rotatable element R with the housing H such that the rotatable element R is adapted to be released to allow movement of the rotatable element R between the first position (FIG. 1) and the second position (FIG. 4). The anti-movement means M includes a front anti-movement member 70 and a rear anti-movement member 72. The front anti-movement member 70 includes a nut 70a having a threaded bore 70b and adapted to threadedly engage threads 30m formed with the shaft portion element 30k of the shaft portion 30b of the front rotatable element 30. The nut 70a is adapted to be threaded on threads 30m to securely engage end surface 40m of the rear rotatable element and when in secure abutment thereto, the front rotatable element 30 is incapable of rotation with respect to the rear rotatable element 40.

The rear anti-movement member 72 includes a nut 72a having a threaded bore 72b adapted to engage threads 40i formed on surface 40h of the shaft portion 40b of the rear rotatable element 40. Preferably, suitable bearing washers or spacers 74, 76 having aligned bores 74a, 76a, therein are adapted to be received on surface 40f of the rear rotatable element adjacent shoulder 40g. The tightening of nut 72a on threads 40i draws the rear rotatable element 40 and front rotatable element 30 into sealing engagement with the tapered surface 18b of the rotatable element chamber 18. The nut 72a bears against the washers 74, 76 which in turn bear against outer surface 16k of the housing 16. With the nuts 70a, 72a in their secured positions, the front rotatable element 30 and the rear rotatable element 40 may not rotate within the rotatable element chamber 18.

Engaging means E are formed with and for independently engaging the front rotatable element 30 and rear rotatable element 40 for independent rotation thereof. Front engaging means 78 is formed with shaft portion element 30k of the front rotatable element adjacent threads 30m. Preferably, the front engaging means 78 includes preferably flat surfaces 78a which may be in a rectangular, hexagonal or any other suitable configuration. The flat surfaces 78a are adapted to be engaged by a suitable tool (not shown) for applying a rotational torque for rotating the front rotatable element 30 when nut 70a is in a non-securing position. Similarly, rear engaging means 80 is formed between end surface 40m and threads 40i of the rear rotatable element 40 and preferably includes flat surfaces 80a adapted to be engaged by a suitable tool (not shown). The flat surfaces 80a may be preferably of a rectangular, hexagonal or any other suitable configuration. Engagement of flat surfaces 80a by such a suitable tool allows a rotational torque to be applied on the rear rotatable element 40 for rotating same after the nut 72a is loosen to a non-engaging position.

The control valve assembly A of the present invention further includes safety means S for constraining and adapted to release fluid pressure trapped within the housing H prior to the removal of the valve capsule C, as described more fully hereinbelow. The safety means S includes a safety plate 86 (FIG. 1) adapted to be disposed about the retaining ring 64 and valve capsule element 60. The safety plate 86 preferably includes a neck portion 86a adapted to be disposed about neck surface 60q of the valve capsule element 60, a radial portion 86b, and an annular portion 86c. Preferably, openings 86d are formed in the annular portion 86c for receiving fasteners such as bolts 90, extending through openings 86d and thereinto threaded openings 16n formed in the housing 16 for engaging the same. Preferably, a suitable gasket 92 is disposed therebetween end surface 86e and end surface 16m for preventing fluid migration therebetween. Preferably, suitable seal means 94, such as an O-ring or any other suitable sealing material, is disposed therebetween the neck portion 86a of the safety plate 86 and the neck surface 60q of the valve capsule element 60 to prevent fluid migration therebetween.

The safety means S further includes safety valve 96 which may include a "stop cock" type valve 96a which is well known in the art. Preferably, the stop cock 96a is in fluid communication with a chamber 86f formed therebetween the inner surface 86g of the safety plate 86 and the surfaces 64c, 60i, by means of opening 86h formed in the safety plate 86.

Figure 2:
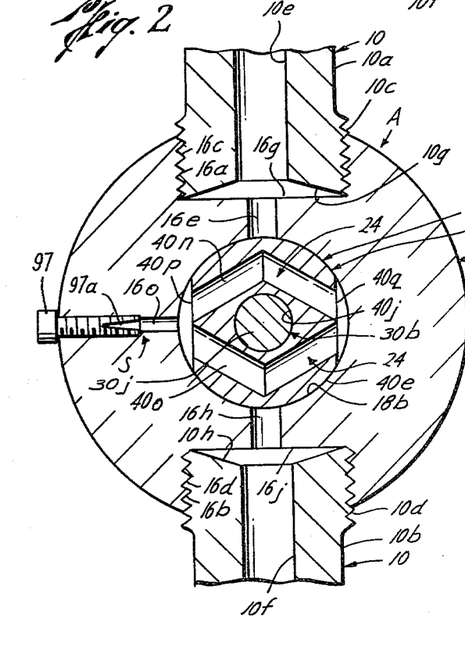
FIG. 2 is an end view, partly in section, taken along the lines 2—2 of FIG. 1 of the control valve assembly of the present invention.

As shown in FIGS. 2, 3, 5, the safety means S further includes passageways 16o, 16p formed in the housing 16. Passageway 16o is adapted to communicate with the rotatable element chamber 18 adjacent the rear rotatable element 40 and passageway 16p is adapted to communicate with the rotatable element chamber 18 adjacent the front rotatable element 30 (FIG. 5). A portion of each of such passageways 16o, 16p is threaded and adapted to receive safety plugs 97, 98, such as bolts or the like, respectively. It should be noted that the safety plugs 97, 98 preferably have means therewith such as slits 97a, 98a capable of allowing fluid leakage therebetween the rotatable element chamber 18 and the environment outside the housing H without requiring full extraction of the safety plugs 97, 98 to provide a venting function as described more fully hereinbelow.

In the use or operation of the control valve assembly A of the present invention, the housing H is adapted to be mounted with the flowline 10. Fluid flowing within the flowline 10 may flow within the housing H through the first flow path 20 alone, the second flow path 24 alone, a combination of first flow path 20 and second flow path 24, or, if desired, may not flow through the housing H at all to cease flow through flowline 10.

As noted hereinabove, the first flow path 20 includes passageways 30p, 60g 50c, 60g' and 30p'. The first flow path 20 is adapted to communicate with the fluid flowing within flowline portions 10a, 10b by passageways 16f, 16i formed with housing 16 and in communication with the bore 10e, 10f, respectively. As shown in FIG. 1, flow through second flow path 24 is blocked because passageways 40n, 40o of the rear rotatable element 40 are misaligned with passage-ways 16e, 16h, respectively formed in housing 16 and therefore prevent flow therethrough. As such, fluid flowing in the direction of arrow 12 in flowline portion 10a is directed from flowline portion 10a through passageways 16g and 16f thereinto first flow path 20 in the direction of arrow 26 wherein fluid flow may flow therethrough and outwardly therefrom through passageways 16i, 16j and outwardly therefrom through bore 10f of flowline portion 10b in the direction of arrow 14. It is intended that this flow path provide the primary path of fluid flow through the control valve assembly A of the present invention. Typically, regulation of fluid through the first flow path 20 is accomplished by the normally operative flow control means F which normally controls fluid flow through the first flow path 20, preferably by valve means V. Should regulation of the fluid flow through the first flow path 20 be desired, the valve actuator 50e of plug valve 50 would be rotated to result in rotation of the valve portion 50a such that passageway 50c formed therein would be misaligned with the passageways 60g, 60g' formed in the valve capsule element 60 of the valve capsule C. By partial misalignment of passageway 50c with passageways 60g, 60g', throttling of the fluid flow through the housing 16 in the direction of arrow 26 may be accomplished. Should it be desired that fluid flow be cut off in its entirety, then the valve actuator 50e need be rotated to such a position that the passageway 50c is totally misaligned with passageways 60g, 60g' resulting in the valve portion 50a blocking the first flow path 20 preventing any fluid flow therethrough. Thus, with the valve means V in such a blocking position, in addition to the second flow path 24 being blocked, a no-flow condition exists through the control valve assembly A of the present invention.

Should it be desired that fluid flow be directed to the second flow path 24 which includes passageways 40n, 40o and slots 40p, 40q formed in the rear rotatable element 40, it is necessary to first release the rear anti-movement member 72 such as loosening nut 72a. The loosening of the rear anti-movement member 72 results in loosening both the front rotatable element 30 and the rear rotatable element 40 within the rotatable element chamber 18. It is desirable to "break" any surface tension between the rotatable element R and the rotatable element chamber 18 by bumping the rotatable element R with a suitable means, such as a soft hammer (not shown) adjacent the front engaging means 78. Similarly, the front anti-movement member 70 should be appropriately released by loosening nut 70a. With nuts 70a, 72a in the loosened position, the front rotatable element 30 and rear rotatable element 40 may rotate independently with respect to one another and each independent of the rotatable element chamber 18 formed in housing 16. By placing an appropriate tool on the front engaging means 78 and another tool on the rear engaging means 80, the independent rotation of the rear rotatable element 40 with respect to the front rotatable element 30 may be accomplished. If the front rotatable element 30 is maintained in substantially the same configuration as shown in FIG. 1 and the rear rotatable element 40 is rotated from the position shown in FIGS. 1 and 2, by substantially 90°, to that as shown in FIG. 4, fluid flow will additionally be directed in the direction of arrow 82 (FIG. 4) through the second flow path 24. Fluid will then flow in addition to flowing through the first flow path 20, also through the second flow path 24 by flowing through the bore 10e of flowline portion 10a through passageways 16g, 16e formed in the housing 16 therethrough passageways 40n, 40o thereinto passageways 16h, 16j of housing 16 and outwardly therefrom in the direction of arrow 14 through bore 10f of flowline portion 10b. As such, flow through the second flow path 24 may be regulated by varying the alignment of the slots 40q, 40p, hence passageways 40n, 40o, with the passageways 16e, 16h formed with the housing 16. In such a fashion, the fluid flow in the second flow path 24 may be regulated as desired, from that of a completely blocked position as shown in FIGS. 1, 2 to a completely open position as shown in FIG. 4. Thus, while flow may be directed through the first flow path 20 and regulated by the valve means V or the front rotatable element 30, the second flow path 24 may also be either in an open position or a closed position as determined by the position of the rear rotatable element 40.

One of the significant features of the control valve assembly A of the present invention is its adaptability for replacing the valve means V without necessitating the stoppage of fluid flow between flowline portions 10a, 10b. It is preferred that fluid flow will be primarily directed through the first flow path 20 with regulation thereof being by valve means V. However, should the valve means V require maintenance and/or replacement thereof, then the appropriate maintenance of the valve means V may be accomplished without requiring stoppage of fluid flow therebetween flowline portions 10a, 10b. To accomplish this result, beginning with the configuration as pictured in FIG. 1, it is necessary that the rear anti-movement member 72 be appropriately released and that the rotatable element R be loosened within the rotatable element chamber 18 by appropriately tapping a soft hammer adjacent the front engaging means 78 to "break" the surface tension between the rotatable element chamber 18 and the rotatable element R for enhancing ease in movement thereof. Longitudinal movement of the rotatable element R along its axis is limited by the retaining ring 64. By loosening only the rear anti-movement member 72, a suitable tool (not shown) contacting the engaging means E may be used for rotating the rotatable element R within the rotatable element chamber 18 such that the second flow path 24 aligns with passageways 16e and 16h as described hereinabove while the first flow path 20 misaligns with passageways 16f, 16i such that passageways 30p, 60g, 50c, 60g', 30p' may be aligned with one another but not in alignment with passageways 16f, 16i formed with the housing 16. It is necessary that the front anti-movement member 70 be released so that the front rotatable element 30 may be appropriately positioned such that the passageways 30p, 30p' formed in the front rotatable element 30 are rotated from that shown in FIGS. 1, 3 to that, preferably substantially 90° therefrom, as shown in FIGS. 4, 5. Thereafter, anti-movement members 70, 72 should be appropriately resecured to secure the rotatable element R within the rotatable element chamber 18.

Inasmuch as the control valve assembly A of the present invention may be used with any types of fluids under varying pressures, it is necessary that the housing H be pressure relieved prior to disassembly, particularly if high pressure fluids are being regulated by the control valve assembly A. For example, should leakage occur adjacent sealing means 34, fluid under pressure may leak into the chamber 86f. Alternatively, it is desired that if a pressure buildup should occur therebetween end surface 60m of the valve capsule element 60 and the end surface 30h of the front rotatable element, longitudinal slot 60p (FIGS. 3, 5) allows communication therewith the cavity therebetween such surfaces and the chamber 86f to prevent any dangerous pressure buildups which may have a tendency to discharge the valve capsule C from the rotatable element R upon release therefrom, as described more fully hereinbelow. Actuation of safety valve 96 communicating with chamber 86f results in the unwanted fluid pressure being bled from within the housing H. Further, should the fluid be of a caustic nature, the fluid may be appropriately directed outwardly therefrom the control valve assembly A without harm or injury to the operator thereof, during such procedure. If the sealing means 34 is effective for preventing fluid leakage, the opening of safety valve 96 will vent the cavity between surfaces 30h, 60m. With the front rotatable element having been moved from its first position to the desired second position as shown in FIGS. 4 and 5, it is desired that safety plug 98 be unthreaded from threaded passageway 16p to such a position that slit 98a is exposed to the atmosphere such that any fluid trapped within the first flow path 20 may be appropriately discharged to atmosphere without requiring the entire removal of the safety plug 98 under potentially dangerous high pressure conditions. For if the fluid were under significant pressure, the removal of the safety plug 98 may result in a significant hazard if it were required to be removed in its entirety being subject to trapped, unknown fluid pressure buildups. As such, only a portion need be unthreaded for venting any unwanted pressure therein the first flow path 20 when in its second position.

At this point, it is desirable to remove the valve actuator 50e by releasing and removing nut 50f and washer 50g from threads 50h. Thereafter, fasteners 90 (FIG. 1) are extracted from within the threaded openings 16n formed in the housing to allow removal of the safety plate 86. The safety plate 86 is slipped over the neck surface 60q, gland nut 50n, and valve stem 50d and removed therefrom. Thereafter, fasteners 62 are removed from the threaded openings 30n formed in the front rotatable element 30. It should be noted that the threaded opening 30n is also in communication with passageways 30p, 30p' such that upon extraction of the fasteners 62, the slits 62a of fasteners 62 are exposed to atmosphere prior to the entire removal of the fasteners 62 therefrom threaded opening 30n. This acts as an additional safety means S in addition to the safety plug 98 for venting any pressurized fluid trapped within the first flow path 20. Once the fasteners 62 are removed, then the valve capsule C may be removed from the front rotatable element 30 with the front rotatable element 30 remaining intact within the housing H. It should be noted that the retaining ring 64 prevents the front rotatable element from moving from the rotatable element chamber 18 inasmuch as surface 30o of the front rotatable element 30 would contact surface 64b of the retaining ring 64 preventing outward movement thereof. It may be necessary that the valve capsule C be appropriately tapped with a suitable tool (not shown), such as a soft hammer, for breaking any surface tension therebetween the valve capsule C and the front rotatable element 30 to facilitate removal.

Once the valve capsule C is removed, the valve means V may be appropriately cleaned, replaced, and/or maintenanced as is required. Replacement valve capsules C having valve means V therein may be kept on hand to speed the replacement thereof. Alternatively, inasmuch as flow through the second flow path 24 is continuing, the need for hurried disassembly-reassembly is not required for fluid continues to flow therethrough the control valve assembly A of the present invention.

Once the valve means V has been appropriately maintenanced, it is preferred that the surfaces 30e, 30g, 30h be appropriately cleaned and that the replacement valve capsule C may be coated with a suitable sealer or releasing agent such as "Never-Seize" manufactured by Never Seize Compound Corporation of Illinois.

The valve capsule C is then reinserted into the front rotatable element 30 such that the passageways 60g, 60g' align with passageways 30p, 30p' with the fasteners 62 being thereafter reinserted into threaded opening 30n to securely mount the valve capsule C with the rotatable element R. It should be noted that surface 60j does not contact surface 30o due to interaction between tapered surfaces 60n, 30g. Thereafter, the safety plate 86 is positioned about the neck portion 60q of the valve capsule element 60 and fasteners 90 are inserted through openings 86d, through gasket 92 thereinto threaded openings 16n formed in the housing 16 for securely mounting the safety plate 86 with the housing H. The valve actuator 50e is thereafter repositioned on valve stem 50d, with washer 50g and nut 50f appropriately securing the valve actuator 50e therewith. The front anti-movement member 70 is thereafter released and after "breaking" the surface tension of the front rotatable element 30 within the rotatable element chamber 18, the front rotatable element 30 may be appropriately rotated within. The front rotatable element 30 is thereafter rotated to its first position as shown in FIG. 1 allowing fluid flow through the first flow path 20. Then, the rear anti-movement member 72 is released and the surface tension of the rear rotatable element 40 within the rotatable element chamber 18 is broken. Holding the front rotatable element 30 by a suitable tool (not shown) engaging the front engaging means 78, the rear rotatable element 40 is rotated to its closed position thus redirecting all fluid flow therethrough the first flow path 20 and closing fluid flow therethrough second flow path 24. The front anti-movement member 70 and rear anti-movement member 72 are thereafter resecured. By removing safety plug 97 from the threaded passageway 16o, the rear rotatable element 40 may be vented. Any continuous leakage and/or leak-through may be detected with the plug 97 removed and may be appropriately corrected by further tightening of the rear anti-movement member 72, noting that tightening of the rear anti-movement member 72 tightens not only the rear rotatable element 40 but also the front rotatable element 30 with the rotatable element chamber 18.

During the changeout procedure of the valve capsule C, fluid flow may be regulated through the second flow path 24 by releasing the rear anti-movement member 72, engaging the rear engaging means 80 by a suitable tool (not shown) and thereafter rotating the rear rotatable element 40 such that an appropriate misalignment between passageways 16e, 16h and the second flow path 24 occur to appropriately regulate fluid flow therethrough the second flow path 24.

As shown in FIGS. 4 and 5, the control valve assembly A of the present invention may further include a retaining ring 164 and safety plate 186 as an alternative to retaining ring 64 and safety plate 86. Retaining ring 164 has an inner annular surface 164a, end surfaces 164b, 164c and exterior annular surface 164d. Openings 164e, 164f are formed within the retaining ring 164.

Safety plate 186 includes a neck portion 186a, a flange portion 186b, an exterior annular surface 186c, an end portion 186d, interior surface 186e and openings 186f formed therein. The retaining ring 164 is suitably mounted with the housing H by fasteners 166 being disposed through openings 164e thereinto threaded opening 16n formed within the housing 16 such that surface 164b engages surface 16m. The safety plate 186 is mounted with the housing H by suitable fasteners 190 such as bolts or the like being inserted through openings 186f formed in the safety plate 186, therethrough aligned openings 164f formed in the retaining plate 166, thereinto threaded opening 161 formed in the housing 16 with surface 186d of the safety plate 186 engaging surface 164c of the retaining ring 164. A suitable sealing means 192 such as an O-ring or the like may be disposed therebetween surfaces 186d, 164c to prevent fluid migration therebetween. Similarly, a suitable sealing means 194 may be disposed between the neck portion 186a of the safety plate 186 and the neck portion 60q of the valve capsule element 60 to prevent fluid migration therebetween. An appropriate safety valve, such as safety valve 96 of FIG. 1, may be mounted with the safety plate 186 if desired. The suitability of safety plates 86, 186 depends upon particular applications of the control valve assembly A in terms of fluids and/or fluid pressures to be contended with, with safety plate 186 being preferable for high pressure applications. In removing the safety plate 186 from the control valve assembly A, the same procedure is followed as described hereinabove with respect to the safety plate 86, with the exception that fasteners 190 need be removed to remove the safety plate 186 from the housing H. Furthermore, it will be appreciated that openings 186f, 164f, and 161 need to be aligned for fasteners 190 to be appropriately mounted therewith the housing H.

Figure 6:
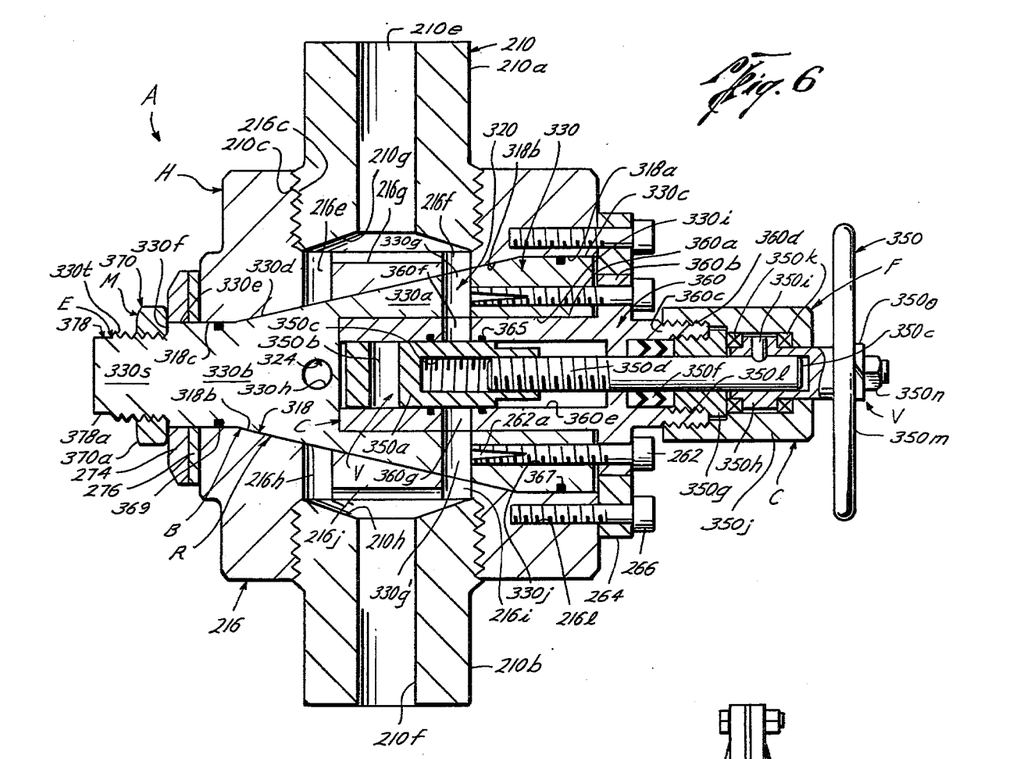
FIG. 6 is an elevational view, partly in section, of the second embodiment of the control valve assembly of the present invention showing an alternate valve means and with no fluid flow through the first flow path or the second flow path preventing fluid flow through the housing; and, FIG. 7 is an elevational view, partly in section, of an alternate valve means mounted with the rotatable element of the control valve assembly of the present invention.

The control valve assembly A of the present invention further includes a second embodiment as shown in FIG. 6. The structure that is substantially identical to the control valve assembly A as shown in FIGS. 1-5 will be referenced with the same numerals as used in FIGS. 1-5 but being preceded by the numeral "2", using the exact alphanumeric digits thereafter. Differing structure will be signified by the use of 300-399 series numbers.

The control valve assembly A of the embodiment of FIG. 6 includes a housing H including housing 216 adapted to be mounted with flowline 210 having flowline portions 210a, 210b. The housing 216 is formed having passageways 216e, 216f communicating with one another through passageway 216g and with bore 210e of flowline portion 210a. Similarly, passageways 216h, 216i formed in housing 216 communicate with one another through passageway 216j which communicates with bore 210f of flowline portion 210b.

Flow control means F and bypass means B mounted substantially within the housing H provide a first flow path 320 to allow the passage of fluid from the flowline 210 through the housing H. The normally operative flow control means F normally controls fluid flow through the first flow path 320. The bypass means B may control fluid flow through the first flow path 320 independent of the flow control means F. The bypass means B further provides for a second flow path 324 to allow the passage of fluid from the flowline 210 through the housing 216 as desired.

The bypass means B is mounted substantially about the flow control means F in the housing H for movement between a first position wherein fluid may flow through the first flow path 320 (FIG. 6) and a second position wherein fluid does not flow through the first flow path 320. Preferably, the bypass means B is mounted for rotatable movement between the first position and the second position, and includes a rotatable element R disposed substantially in the housing H. The first flow path 320 is adapted to communicate with the flowline 210 when in the first position and not adapted to communicate with the flowline 210 when in the second position.

The rotatable element R includes rotatable element 330 adapted to be disposed within rotatable element chamber 318. The rotatable element 330 includes a body portion 330a, a shaft portion 330b and includes exterior annular surface 330c, conical, tapered surface 330d, annular surface 330e, shoulder 330f, shaft 330s having threads 330t therewith.

The rotatable element 330 is adapted to be disposed within rotatable element chamber 318 formed of annular surface 318a, tapered surface 318b and annular surface 318c all formed within housing 216. It should be noted that tapered surfaces 330d and 318b are continuous between surfaces 330c, 318a and 330e, 318c, respectively, without any lips or shoulders as per 18c, 40d of FIG. 1. The rotatable element 330 is adapted to be disposed within the rotatable element chamber 318. The rotatable element 330 is formed having passageways 330g, 330h extending therethrough substantially transverse to the longitudinal axis thereof. Preferably, passageways 330g, 330g', 330h are substantially transverse to one another in parallel planes and extend through the longitudinal axis of the rotatable element 330. The passageways 330g, 330g' are adapted to communicate with passageways 216f, 216i formed with the housing 216 and passageway 330h is adapted to communicate with passageways 216e, 216h formed with the housing 216, when appropriately positioned. Preferably, a bore 330i is formed within the rotatable element 330 for receiving the valve capsule C.

The valve capsule C includes a valve capsule element 360 to be disposed within the bore 330i with the valve capsule element 360 adapted to receive valve means V therein. The valve capsule element 360 includes an outer annular surface 360a to engage bore 330i, a flange portion 360b, a neck portion 360c having threads 360d formed therewith and an inner bore 360e. The valve means V is adapted to be disposed within the inner bore 360e.

As shown in FIG. 6, the valve means V includes a gate valve such as one manufactured by Cameron Manufacturing Company and is well known in the art. The gate valve 350 includes a gate 350a having a passageway 350b formed therein and adapted to extend therethrough for alignment with passageways 360f, 360g formed in the valve capsule element 360. The gate 350a further includes internal threads 350c adapted to engage threads 350d on valve shaft 350e. Suitable packing 350f as secured by packing nut 350g is disposed about the valve shaft 350e. An appropriate handle shaft 350h is pinned by pin 350i to the valve shaft 350e. A valve cap 350j is adapted to be disposed about the handle shaft 350h and further mounts suitable bearings 350k therebetween the handle shaft 350h and valve cap 350j. The valve cap 350j includes threads 350l for engaging threads 360d of the valve capsule element 360. Valve actuator 350m is appropriately affixed to the handle shaft 350h by nut 350n and washer 350o.

Appropriate sealing means 365 are disposed therebetween the inner bore 360e of the valve capsule element 360 and the gate 350a of gate valve 350 for sealing relation therebetween. Sealing means 367 is disposed between surface 318a and surface 330c while sealing means 369 is disposed therebetween surface 318c and 330b, respectively, to prevent fluid migration therebetween. Retaining ring 264 is secured to the housing 216 by appropriate fasteners 266 threadedly engaging openings 216l formed within the housing 216.

The valve capsule C is secured to the rotatable element R by appropriate fasteners 262 extending into and threadedly engaging threaded opening 330j formed in the rotatable element 330. As with fasteners 62 (FIG. 1), fasteners 262 provide a venting function upon suitable retracting of the fasteners 262 for exposing the longitudinal slit 262a thereof, as part of the safety means S. The engaging means E includes engaging member 378 having appropriate flat surfaces 378a adapted to be engaged by a suitable tool (not shown) for rotation of the rotatable element R.

The control valve assembly A as shown in FIG. 6 operates similarly to the control valve assembly A described hereinabove with respect to FIGS. 1–5. However, the operation differs with respect to the fact that the rotatable element R of FIG. 6 includes the rotatable element 330 of a unitary construction rather than the front rotatable element 30-rear rotatable element 40 configuration of FIGS. 1–5. As such, the rotatable element R is incapable of having simultaneous flow through the first flow path 320 and second flow path 324. As shown in FIG. 6, fluid flow may enter through flowline portion 10a and flow through passageways 216g, 216f thereinto passageway 330g formed in the rotatable element 330, thereinto passageway 360f formed in the valve capsule element 360. As shown in FIG. 6, fluid flow is blocked by the valve means V such that the normally operative flow control means F is blocking flow through the first flow path 320. Upon the appropriate rotation of the valve actuator 350m resulting in rotation of the valve shaft 350e, the gate 350a is retracted towards the valve actuator 350m until the passageways 350b formed within gate 350a aligns with the passageways 360f, 360g formed in the valve capsule element 360 as well as passageways 330g, 330g' in rotatable element 330. Upon alignment of such passageways, flow through the first flow path 320 is completed. Thus, the first flow path 320 includes passageways 330g, 360f, 350b, 360g and 330g'. Regulation of fluid flow through the valve means V may be accomplished by varying the exposure of the passageway 350b to that of passageways 360f, 360g for metering and regulating fluid flow therethrough.

Should it be desired that the flow control means F be replaced because of malfunction as above, then, the anti-movement means M including anti-movement member 370 such as nut 370a engaging threads 330f of the shaft 330g must be unsecured. Upon release thereof, the surface tension of the rotatable element 330 within the rotatable element chamber 318 adjacent tapered surfaces 330d, 318b, respectively, is broken by appropriately tapping on the shaft portion 330g of the rotatable element 330 by an appropriate tool such as a soft hammer (not shown). The rotatable element 330 is then rotated within the rotatable element chamber 318. As such, once released, the rotatable element 330 is adapted to be rotated substantially 90° to allow exposure of the second flow path 324 to the passageways 216e, 216h formed in the housing 216. Metering of fluid flow therebetween flowline portions 210a, 210b may be accomplished by varying exposure of the opening 330h of the second flow path 324 to the passageways 216e, 216h. Thus, flow is effectively shut off through the first flow path 320 and directed through the second flow path 324 in a bypass mode about the normally operative flow control means F. Fluid flow will be substantially continuous, excepting for the short time interval when both flow paths 320, 324 are blocked. Thereafter, the nut 370a should be resecured to prevent further rotation of the rotatable element 330.

As described hereinabove, the valve capsule C and the valve means V therewith may thereafter be removed after venting as described hereinabove and the removal of fasteners 262 from the housing 216. After the repair of the valve means V, the capsule may be reinstalled into the rotatable element 330 with fasteners 262 resecuring the same thereto. Thereafter, the anti-movement member 370 is thereafter unsecured and the rotatable element 330 rotated 90° by engaging same with engaging means E to a position where fluid flow through the second flow path 324 is blocked and fluid communication through first flow path 320 is reestablished, with the metering and valving function being thereafter controlled by valve means V. It will be appreciated that an appropriate safety plate as safety plate 86 (FIG. 1) or safety plate 186 (FIG. 4), may be incorporated and used with such control valve assembly A of FIG. 6.

Figure 7:
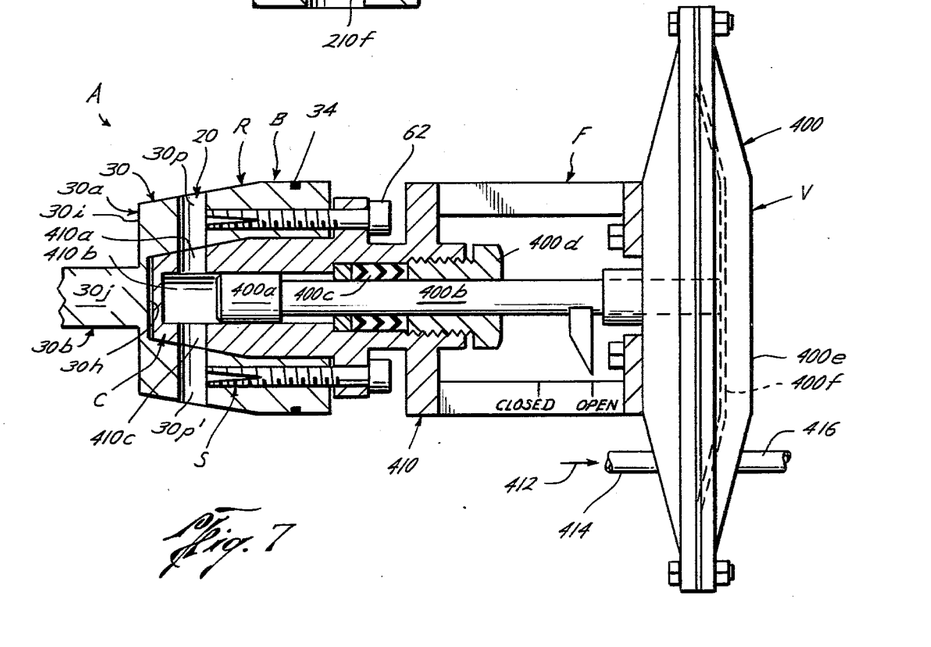

As is apparent from the above disclosure, the valve means V may include a wide variety of valves adapted to be disposed within the valve capsule C of the control valve assembly A of the present invention and is not limited to any particular type of valve means V that may potentially be disposed within the valve capsule C. For example, as shown in FIG. 7, a cage-type valve 400 is adapted to be disposed within the valve capsule element 410. As is evident, the valve capsule element 410 is similar to valve capsule element 60 of FIG. 1, however, being adapted to particularly suit the particular type of valve arrangement desired to control fluid flow through the first flow path 20. As shown in FIG. 7, the cage-type valve 400 includes valve element 400a connected with valve shaft 400b having a suitable packing material 400c disposed about the valve shaft 400b within the valve capsule element 410 and adapted to be secured therein by suitable packing nut 400d. As such, the cage-type valve 400 may be actuated by fluid pressure entering actuating chamber 400e in the direction of arrow 412 through line 414 with such fluid pressure acting upon a diaphragm 400f therewithin actuating chamber 400e and operatively connected with the valve shaft 400b to result in lateral movement thereof.

As shown in FIG. 7, the cage-type valve 400 is in an open position allowing flow through the first flow path 20 with fluid being capable of flowing through passageway 30p, passageway 410a in valve capsule element 410, thereinto chamber 410b within the valve capsule element 410, through passageway 410c and thereinto passageway 30p'. Should it be desired that the cage-type valve 400 be closed, fluid would be directed into line 416, or a suitable vacuum imposed in line 414, thus urging the diaphragm 400f in the opposing direction to appropriately close off the chamber 410b, thus effectively blocking the first flow path 20. Varying pressures within lines 414, 416 result in partial regulation and metering of fluid flow through the first flow path 20. The cage-type valve 400 may alternatively be mechanically actuated or actuated by any other suitable means.

Thus, it is intended that the valve means V be of any suitable design in construction to meet the various pressure and/or fluid requirements of the fluid flowing therewithin the control valve assembly A of the present invention. The valve means V may include other valves such as ball valves, butterfly valves, flapper valves, or any other suitable valves as necessary or as desired to meet the particular demands necessary.

Thus, the control valve assembly of the present invention provides a new and improved way of controlling fluid flow in a flowline and is particularly well suited for the replacement of a normally operative flow control means while maintaining fluid flow through the valve while such flow control means is being replaced or maintenanced. Furthermore, the control valve assembly A of the present invention provides a unique and novel way of metering fluid flow to no less than two flow paths by means of the bypass means B independent of and in addition to the normally operative flow control means F.

The foregoing disclosure and description of the invention are illustrative and explanatory thereof, and various changes in the size, shape and materials as well as in the details of the illustrated construction may be made without departing from the spirit of the invention.

We claim:

1. A control valve assembly for controlling fluid flow in a flowline, comprising:

a housing adapted to be mounted with the flowline;
a normally operative flow control means and a movable element mounted substantially within said housing forming a first flow path to allow the passage of fluid from the flowline through said housing;
said normally operative flow control means normally controlling flow through said first flow path;
said movable element being for controlling flow through said first flow path independently of said normally operative flow control means;
said movable element having a second flow path formed therein to allow the passage of fluid from the flowline through said housing as desired; and,
safety means mounted with said movable element and in communication with said first flow path for releasing fluid pressure trapped in said first flow path between said movable element and said housing.

2. The control valve assembly of claim 1, wherein:
said movable element is mounted substantially about said flow control means in said housing for movement between a first position wherein fluid flows through said first flow path and a second position wherein fluid does not flow through said first flow path.

3. The control valve assembly of claim 2, wherein:
said movable element is mounted in said housing for rotatable movement between said first position and said second position, said first flow path adapted to communicate with the flowline when said rotatable element is in said first position, said first flow path adapted to not communicate with the flowline when said rotatable element is in said second position.

4. The control valve assembly of claim 3, wherein:
said rotatable element is of a substantially conical configuration adjacent said first and second flow paths.

5. The control valve assembly of claim 3, wherein said safety means further includes:
a first safety bolt mounted for removal within a first opening formed in said housing, said first opening in fluid communication with said first flow path when said rotatable element is in said second position; and,
a second safety bolt mounted for removal within a second opening formed in said housing, said second opening adapted to be in fluid communication with said second flow path.

6. The control valve assembly of claim 1, further including:
seal means disposed between said movable element and said housing for preventing fluid migration therebetween.

7. The control valve assembly of claim 1, wherein:
said movable element includes a shaft portion extending from said housing and having seal means disposed between said shaft portion and said housing to prevent fluid migration therebetween.

8. A control valve assembly for controlling fluid flow in a flowline, comprising:
a housing adapted to be mounted with the flowline;
a normally operative flow control means and a movable element mounted substantially within said housing forming a first flow path to allow the passage of fluid from the flowline through said housing;
said normally operative flow control means normally controlling flow through said first flow path and including a valve capsule removably disposed substantially within said movable element;
safety means with said movable element and in communication with said first flow path for releasing fluid pressure trapped in said first flow path between said movable element and said housing prior to removal of said valve capsule;
said movable element being for controlling flow through said first flow path independently of said normally operative flow control means; and,
said movable element having a second flow path formed therein to allow the passage of fluid from the flowline through said housing as desired.

9. A control valve assembly for controlling fluid flow in a flowline, comprising:
a housing adapted to be mounted with the flowline;
a normally operative flow control means and a movable element mounted substantially within said housing forming a first flow path to allow the passage of fluid from the flowline through said housing;
said normally operative flow control means normally controlling flow through said first flow path and including:
valve means for regulating flow within said first flow path; and,
a valve capsule removably disposed substantially within said movable element for receiving said valve means therein;
said movable element being for controlling flow through said first flow path independently of said valve means;
said movable element having a second flow path formed therein to allow the passage of fluid from the flowline through said housing as desired; and,
said valve capsule being removable from said movable element when flow through said first flow path is blocked by said movable element while fluid flow through said second flow path may continue as desired.

10. The control valve assembly of claim 9, further including:
means for releasably mounting said valve capsule within said rotatable element such that said valve capsule and said valve means may be removed from said rotatable element when said rotatable element is in said second position.

11. A control valve assembly for controlling fluid flow in a flowline, comprising:
a housing adapted to be mounted with the flowline;
valve means, a valve capsule, and a rotatable element mounted substantially within said housing for providing a first flow path to allow the passage of fluid from the flowline through said housing;
said valve means normally controlling flow through said first flow path;
said valve capsule removably disposed substantially within said rotatable element for receiving said valve means therein;
said rotatable element for controlling flow through said first flow path independent of said vlave means;
said rotatable element having a second flow path formed therein and in communication with the flowline to allow passage of the fluid from the flowline through said housing as desired;
said rotatable element being movable between a first position wherein fluid flows through said first flow path and a second position wherein fluid does not flow through said first flow path; and,
said valve capsule being removable from said rotatable element when flow through said first flow path is blocked by said rotatable element while fluid flow through said second flow path may continue as desired.

12. A bypass apparatus adapted to be mounted in a valve housing having a valve member therein for controlling fluid flow in a flowline communicating with the valve housing, comprising:
a rotatable element adapted to be mounted substantially within the valve housing;
a valve capsule removably disposed substantially within said rotatable element;
said rotatable element, said valve capsule, and the valve member forming the first flow path for allowing passage of fluid between the flowline and the valve housing when said rotatable element is mounted with the valve housing;

said valve capsule receiving the valve member therein for normally regulating flow within the first flow path;

said rotatable element for controlling flow through the first flow path independent of the valve member when said rotatable element is mounted with the valve housing;

said rotatable element having a second flow path formed therein and adapted to communicate with the flowline when mounted with the valve housing to allow passage of the fluid from the flowline through the valve housing, as desired;

said rotatable element adapted to be mounted for rotational movement in the housing from a first position wherein fluid flows through the first flow path and a second position where fluid does not flow through the first flow path; and, said valve capsule being removable from said rotatable element when in said second position while permitting fluid flow through said second flow path as desired.

13. The bypass apparatus of claim 12, further including:
means for releasably mounting said valve capsule within said rotatable element such that said valve capsule having the valve means therewith may be removed from said rotatable element as a unit.

14. A bypass apparatus adapted to be mounted in a valve housing having a normally operative flow control means for normally controlling fluid flow through a first flow path for controlling fluid flow in a flowline communicating with the valve housing, the normally operative flow control means including valve means for regulating fluid flow, comprising:

a rotatable element adapted to be mounted substantially within the valve housing;

said rotatable element cooperating with and adapted to removably receive the normally operative flow control means therein to provide the first flow path to allow passage of fluid between the flowline and the valve housing when said rotatable element is mounted with the valve housing;

said rotatable element for controlling flow through the first flow path independent of the normally operative flow control means when said rotatable element is mounted with the valve housing;

said rotatable element having a second flow path formed therein and adapted to communicate with the flowline when mounted with the valve housing to allow passage of the fluid from the flowline through the valve housing, as desired;

said rotatable element adapted to be mounted for movement in the housing from a first position wherein fluid flows through the first flow path and a second position where fluid does not flow through the first flow path;

a valve capsule removably mounted within said rotatable element for receiving the valve means therein for regulating flow within the first flow path; and, means with said rotatable element for removably mounting said valve capsule with said rotatable element when said rotatable element is in said second position.

15. The bypass apparatus of claim 14, wherein:
said rotatable element is adapted to move in the valve housing between an open position wherein fluid flows through said second flow path while fluid does not flow through the first flow path and a closed position wherein fluid does not flow through said second flow path.

16. The bypass apparatus of claim 15, further including:
engaging means formed with said rotatable element to allow rotation of said rotatable element when mounted with the valve housing for moving said rotatable element between said first position and said second position and said open position and said closed position.

17. The bypass apparatus of claim 14, wherein:
said rotatable element is of a substantially conical configuration.

18. A control valve assembly for controlling fluid flow in a flowline, comprising:

a housing adapted to be mounted with the flowline;

a normally operative flow control means and a front rotatable element mounted substantially within said housing for providing a first flow path to allow the passage of fluid from the flowline through said housing;

said normally operative flow control means normally controlling flow through said first flow path;

said front rotatable element for controlling flow through said first flow path independently of said normally operative flow control means and having:
a body portion having said first flow path formed therewith and adapted for receiving said normally operative flow control means therein;
a shaft portion extending from said body portion through said housing;

a rear rotatable element having a second flow path formed therein and in communication with the flowline to allow passage of the fluid from the flowline through said housing as desired;

said rear rotatable element being disposed about said shaft portion of said front rotatable element substantially within said housing; and, said front rotatable element being movable between a first position wherein fluid flows through said first flow path and a second position wherein fluid does not flow through said first flow path.

19. The control valve assembly of claim 18, further including:
front anti-movement means for releasably securing said front rotatable element with said housing and adapted to be released to allow movement of said front rotatable element between said first position and said second position.

20. The control valve assembly of claim 18, further including:
rear anti-movement means for releasably securing said rear rotatable element with said housing and adapted to be released to allow movement of said rear rotatable element between an open position wherein fluid flows through said second flow path and a closed position wherein fluid does not flow through said second flow path.

21. The control valve assembly of claim 18, further including:
engaging means formed with and for independently engaging said front rotatable element and said rear rotatable element for independent rotation thereof.

22. The control valve assembly of claim 18, further including:
seal means disposed between said shaft portion and said rear rotatable element for preventing fluid migration therebetween.

23. A bypass apparatus adapted to be mounted in a valve housing having a normally operative flow control means for normally controlling flow through a first flow path for controlling fluid flow in a flowline communicating with the valve housing, comprising:
- a front rotatable element adapted to be mounted substantially within the valve housing;
- said front rotatable element cooperating with and adapted to receive the normally operative flow control means therein to provide the first flow path to allow passage of fluid between the flowline and the valve housing;
- said front rotatable element for controlling flow through the first flow path independently of the normally operative flow control means when said front rotatable element is mounted with the valve housing;
- said front rotatable element having a body portion having a part of the first flow path formed therein and adapted to receive the normally operative flow control means therein;
- a rear rotatable element having a second flow path formed therein and adapted to communicate with the flowline when mounted with the valve housing to allow passage of the fluid from the flowline through the valve housing as desired; and,
- said front rotatable element being movable between the first position wherein fluid flows through the first flow path and a second position wherein fluid does not flow through the first flow path.

24. The bypass apparatus of claim 23, wherein:
said front rotatable element has a shaft portion extending from said body portion, said shaft portion adapted to extend through the valve housing when mounted therewith; and,
said rear rotatable element is disposed about said shaft portion of said front rotatable element.

25. The bypass apparatus of claim 24, further including:
seal means disposed between said shaft portion and said rear rotatable element for preventing fluid migration therebetween.

26. The bypass apparatus of claim 23, further including:
engaging means formed with and for independently engaging said front rotatable element and said rear rotatable element for independent rotation thereof.

27. The bypass apparatus of claim 23, wherein the normally operative flow control means includes valve means for regulating flow, further including:
a valve capsule disposed substantially within said front rotatable element for receiving the valve means therein for regulating flow within the first flow path.

28. The bypass apparatus of claim 27, further including:
means for releasably mounting said valve capsule within said front rotatable element such that said valve capsule having the valve means therewith may be removed from said front rotatable element as a unit.

29. The bypass apparatus of claim 23, wherein:
said rotatable elements are of a substantially conical configuration.

* * * * *